US012753729B2

(12) United States Patent
Matsui

(10) Patent No.: US 12,753,729 B2
(45) Date of Patent: Oct. 6, 2026

(54) INFORMATION PROCESSOR FOR VEHICLE

(71) Applicant: TOYOTA JIDOSHA KABUSHIKI KAISHA, Toyota (JP)

(72) Inventor: Masayuki Matsui, Ichinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 25 days.

(21) Appl. No.: 19/000,490

(22) Filed: Dec. 23, 2024

(65) Prior Publication Data

US 2025/0250946 A1 Aug. 7, 2025

(30) Foreign Application Priority Data

Feb. 6, 2024 (JP) ................................ 2024-016276

(51) Int. Cl.
*G06F 19/00* (2018.01)
*F02D 41/02* (2006.01)
*F02D 41/06* (2006.01)

(52) U.S. Cl.
CPC ......... *F02D 41/021* (2013.01); *F02D 41/062* (2013.01); *F02D 2200/50* (2013.01)

(58) Field of Classification Search
CPC ........ F01N 11/00; F02D 41/021; G08B 21/14
USPC .......................................................... 701/113
See application file for complete search history.

(56) References Cited

U.S. PATENT DOCUMENTS

2017/0363326 A1* 12/2017 Vandrak .................. F23N 1/002
2020/0249213 A1* 8/2020 Gregg .................... G07C 5/008
2020/0269688 A1* 8/2020 Dagley ................ G06N 3/0464
2021/0095514 A1* 4/2021 Madden ..................... E04H 6/42
2023/0021474 A1* 1/2023 Hoki ....................... B60L 1/006
2023/0089131 A1* 3/2023 Nasis ................. B60H 1/00742 454/68
2023/0133128 A1* 5/2023 Ogawa ................. G06N 3/0499 701/108
2023/0282091 A1* 9/2023 Padani ................... G08B 21/14 340/584
2024/0149089 A1* 5/2024 Archer ................... A62C 27/00

FOREIGN PATENT DOCUMENTS

JP 2012233409 A 11/2012
JP 2017137765 A 8/2017
JP 2022098757 A 7/2022
JP 2023092837 A 7/2023

* cited by examiner

*Primary Examiner* — Hung Q Nguyen
*Assistant Examiner* — James J Kim

(57) ABSTRACT

A configuration is employed in a vehicle including a power feed device capable of performing external power feed that supplies electric power generated by a generator using driving force of an engine to a load outside the vehicle. The configuration executes a process for obtaining location information related to a location where the vehicle is located. The process is initiated by reception of execution of the external power feed. The configuration further executes a determination process for determining, based on the location information, whether the location where the vehicle is located satisfies a condition indicating a location where ventilation is poor. On condition that the determination result in the determination process is affirmative, the configuration outputs notification information for notifying the user that the location of the vehicle needs to be changed.

7 Claims, 4 Drawing Sheets

INFORMATION PROCESSOR FOR VEHICLE

CROSS-REFERENCE TO RELATED APPLICATIONS

This application is based upon and claims the benefit of priority from Japanese Patent Application No. 2024-016276, filed on Feb. 6, 2024, the entire contents of which are incorporated herein by reference.

BACKGROUND

1. Field

The following description relates to an information processor for a vehicle.

2. Description of Related Art

Japanese Laid-Open Patent Publication No. 2023-092837 discloses a hybrid electric vehicle that includes an engine, a generator, a power line, a connection device, and a relay. The generator generates electric power using driving force of the engine. The power line connects the generator and the connection device. The connection device is connected to a load outside the vehicle. The relay is arranged in the power line. When the relay is kept ON in a state in which the generator is generating electric power by operation of the engine, the electric power generated by the generator is supplied to the load outside the vehicle.

The technique described in the above patent publication performs external power feed using the engine as a drive source. During the external power feed, the operation of the engine is continued. Accordingly, during the external power feed, the engine continues to release exhaust to the outside of the vehicle. Therefore, when the external power feed is performed in a location where ventilation is poor, the exhaust may fill the surroundings of the vehicle. In order to avoid such a situation, a user may perform the external power feed in a location where ventilation is sufficient.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an information processor is for a vehicle. The vehicle includes a power feed device configured to perform external power feed that supplies power generated by a generator using driving force of an engine to a load outside the vehicle. The information processor includes processing circuitry. The processing circuitry is configured to execute an information acquisition process, a determination process, and an output process. The information acquisition process acquires location information related to a location of the vehicle. The determination process determines, based on the location information, whether the location of the vehicle satisfies a predetermined condition indicating a location where ventilation is poor. The determination process is initiated by reception of execution of the external power feed. The output process outputs notification information for notifying a user that the location of the vehicle needs to be changed. The output process is performed in response to the determination process determining that the location of the vehicle satisfies the predetermined condition.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Overall Configuration

Figure 1:
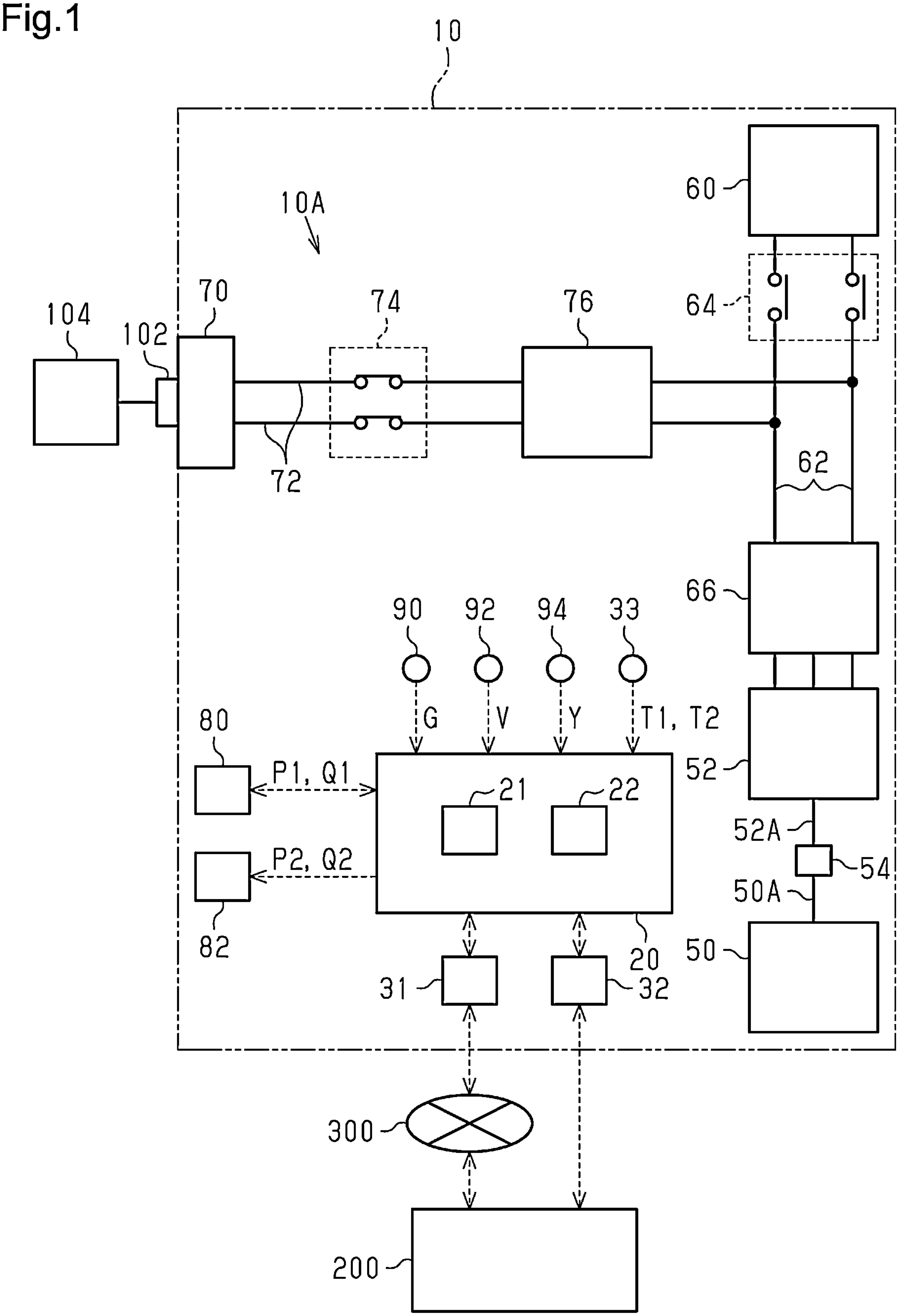
FIG. 1 is a schematic diagram showing the configuration of a vehicle.

An embodiment of an information processor for a vehicle will now be described with reference to the drawings. As shown in FIG. 1, the vehicle 10 includes an engine 50, a generator motor 52, and a clutch 54. The engine 50 includes a crankshaft 50A. The engine 50 burns a mixture of fuel and intake air. The crankshaft 50A rotates according to the combustion of the air-fuel mixture. The engine 50 discharges exhaust gas generated according to combustion of the air-fuel mixture to the outside of the vehicle 10. The generator motor 52 has both functions of a generator and a motor. The generator motor 52 includes a rotation shaft 52A. The rotation shaft 52A is coupled to the crankshaft 50A via a clutch 54. The generator motor 52 can generate electric power by the power of the engine 50. The clutch 54 is switched between a connected state and a disconnected state. When the clutch 54 is in the connected state, the crankshaft 50A and the rotation shaft 52A of the generator motor 52 are connected. When the clutch 54 is in the disengaged state, the crankshaft 50A and the rotation shaft 52A of the generator motor 52 are disconnected from each other. The vehicle 10 can travel by the power of at least one of the engine 50 and the generator motor 52. That is, the vehicle 10 is a hybrid electric vehicle.

The electric vehicle 10 includes a battery 60, a main line 62, a main relay 64, and a PCU 66. The battery 60 is a rechargeable battery. The main line 62 connects the battery 60 and the PCU 66. The main relay 64 is positioned in the middle of the main line 62. The main relay 64 is switched to a connected state or a disconnected state. When the main relay 64 is in the connected state, the electrical connection between the battery 60 and the PCU 66 is turned on. When the main relay 64 enters the disconnected state, the electrical connection between the battery 60 and the PCU 66 is turned off. The PCU 66 is located between the battery 60 and the generator motor 52. The PCU 66 includes step-up/down converters and inverters. That is, the PCU 66 steps up and down the voltage between the battery 60 and the generator motor 52, and performs DC/AC voltage conversion.

The vehicle 10 includes a connection device 70, a power feed line 72, a power feed relay 74, and a conversion device 76. The connection device 70 is installed on the body of the vehicle 10. An electric load 104 outside the vehicle can be connected to the connection device 70 via a connector 102. The power feed line 72 connects the connection device 70 and an intermediate portion of the main line 62. Specifically, the intermediate portion of the main line 62 is a portion of the main line 62 between the main relay 64 and the PCU 66. The conversion device 76 is located in the middle of the power feed line 72. The conversion device 76 performs DC/AC conversion and the like. The power feed relay 74 is positioned in the middle of the power feed line 72. More specifically, the power feed relay 74 is located between the connection device 70 and the conversion device 76. The power feed relay 74 is switched between a connected state and a disconnected state. It is now assumed that an electric load 104 outside the vehicle is connected to the connection device 70. When the power feed relay 74 is in the connected state, the electrical connection between the electric load 104 and the PCU 66 and thus the generator motor 52 is turned on. When the power feed relay 74 is in the disconnected state, the electrical connection between the electric load 104 and the PCU 62, and thus the generator motor 52, is turned off.

An electric path from the connection device 70 to the PCU 66 is referred to as a power feed path. The devices located in the power feed path, the generator motor 52, the clutch 54, and the engine 50 constitute a power feed device 10A. The devices on the power feed path include the connection device 70, the power feed line 72, the power feed relay 74, the conversion device 76, the main line 62, and the PCU 66. The power feed device 10A can perform external power feed. The external power feed is to supply electric power generated by the generator motor 52 using the power of the engine 50 to the electric load 104 outside the vehicle.

Although not shown, the vehicle 10 includes a charging device that charges the battery 60 with electric power from outside the vehicle. The charging device includes a charging line that connects the connection device 70 and the battery 60, a charging relay that turns on and off the electrical connection of the charging line, and the like.

The vehicle 10 includes an information processor 20. The information processor 20 includes a processing circuit including a CPU 21 and a memory 22. The memory 22 includes three types of memories, that is, a RAM, a ROM, and an electrically rewritable nonvolatile memory. In the present embodiment, these three types are collectively referred as the memory 22. The memory 22 stores, in advance, various programs in which processes to be executed by the CPU 21 are described and various types of information necessary for the CPU 21 to execute the programs.

The vehicle 10 includes a display 80. The display 80 is located inside the vehicle. The display 80 is configured to establish communication with the information processor 20. The display 80 displays an image corresponding to the command information output by the information processor 20. The display 80 is of a touch panel type. That is, when the user performs an input operation on the display 80, the display 80 outputs information corresponding to the input operation to the information processor 20.

The vehicle 10 includes a speaker 82. The speaker 82 is located inside the vehicle. The speaker 82 can communicate with the information processor 20. The speaker 82 emits a sound corresponding to command information output by the information processor 20.

The vehicle 10 includes a first communication device 31. The first communication device 31 is a device for the information processor 20 to wirelessly communicate with the user terminal 200 via the external communication network 300. The user terminal 200 is an operation terminal held by a user. The user terminal 200 is, for example, a smartphone. The user terminal 200 includes a CPU, a memory, a display screen, a first device, a second device, and the like. The display screen is of a touch panel type. The first device is a device for the user terminal 200 to wirelessly communicate with the vehicle 10 via the external communication network 300. The second device is a device for the user terminal 200 to perform short-range wireless communication with the vehicle 10. The near field communication will be described later.

The vehicle 10 includes a second communication device 32. The second communication device 32 is a device for the information processor 20 to perform short-range wireless communication with the user terminal 200. The short-range wireless communication is direct wireless communication performed by the user terminal 200 and the second communication device 32 when the user terminal 200 is located within a range of a predetermined distance from the vehicle 10. That is, the short-range wireless communication is wireless communication that does not use the external communication network 300. The predetermined distance is, for example, 5 meters. The second communication device 32 performs short-range wireless communication according to the BLE communication standard. BLE is an abbreviation of Bluetooth® Low Energy. When performing wireless communication via the second communication device 32, the information processor 20 establishes short-range wireless communication with the user terminal 200 in advance. The information processor 20 establishes short-range wireless communication with the user terminal 200 when receiving a request signal for establishing short-range wireless communication from the user terminal 200 in response to a reception signal issued by the second communication device 32 for a range within a predetermined distance. The acceptance signal and the request signal include information such as an ID assigned to each device in advance.

The vehicle 10 includes a changeover switch 33. The changeover switch 33 is located, for example, near the connection device 70. The changeover switch 33 outputs a start signal T1 or an end signal T2 of external power feed to the information processor 20 in response to a user's operation. The start signal T1 is a command signal for instructing start of execution of external power feeding. The end signal T2 is a command signal for instructing ending of external power feeding. The changeover switch 33 outputs the start signal T1 or the end signal T2 only when the electric load 104 outside the car is connected to the connection device 70 via the connector 102.

The vehicle 10 includes a plurality of cameras 90. In FIG. 1, one of the plurality of cameras 90 is shown as a representative. The plurality of cameras 90 include an in-vehicle camera and an out-vehicle camera. The in-vehicle camera includes two cameras for front imaging and rear imaging. These in-vehicle cameras are installed on, for example, a windshield and a rear window in the vehicle. The in-vehicle camera images the outside of the vehicle through the window. The vehicle exterior cameras include four cameras for front imaging, rear imaging, left imaging, and right imaging. These vehicle exterior cameras are installed, for example, around front and rear license plates and on side mirrors. The vehicle exterior camera images the outside of the vehicle.

Each of the cameras 90 generates a captured image G which is image data targeting each of the imaging ranges. In the captured image G, an object 400 located around the vehicle 10 outside the vehicle can be depicted. The position and size of the object 400 depicted in the captured image G reflect the distance D1, D2, D3 between the vehicle 10 and the object 400, that is, the positional relationship between the vehicle 10 and the object 400. As can be seen from this, the captured image G is information indicating a positional relationship between the vehicle 10 and an object 400 located outside the vehicle. The positional relationship between the vehicle 10 and the object 400 indicates a place where the vehicle 10 is located, for example, the vehicle 10 is located near the object 400. That is, the captured image G is location information which is information on a location where the vehicle 10 is located. When generating the captured image G, each camera 90 outputs the generated captured image G to the information processor 20. Each of the cameras 90 is a device that acquires information on a place where the vehicle 10 is currently located.

The vehicle 10 includes an exhaust gas sensor 92. The exhaust sensor 92 is installed, for example, on a front bumper of the vehicle 10. The exhaust sensor 92 detects a concentration V of a specific component in the ambient atmosphere of the vehicle 10. The specific component is a component other than oxygen and nitrogen among components contained in the exhaust gas from the engine 50. An example of the specific component is carbon monoxide. Another example of the specific component is a nitrogen oxide. The exhaust gas sensor 92 of the present embodiment detects the concentration V of only one of various specific components. The vehicle 10 of the present embodiment includes only one such exhaust gas sensor 92. When the exhaust sensor 92 detects the concentration V of the specific component, the exhaust sensor 92 outputs a signal corresponding to the detected concentration V to the information processor 20.

The vehicle 10 includes a crank position sensor 94. The crank position sensor 94 is installed in the vicinity of the crankshaft 50A. The crank position sensor 94 detects a rotational position Y of the crankshaft 50A. When detecting the rotational position Y of the crankshaft 50A, the crank position sensor 94 outputs a signal corresponding to the detected rotational position Y to the information processor 20.

Power Feed Process

The information processor 20 controls various parts in the vehicle 10, such as the power feed device 10A, the main relay 64, the display 80, and the speaker 82. The information processor 20 can cause the power feed device 10A to perform external power feeding by controlling the power feed device 10A.

Figure 2:
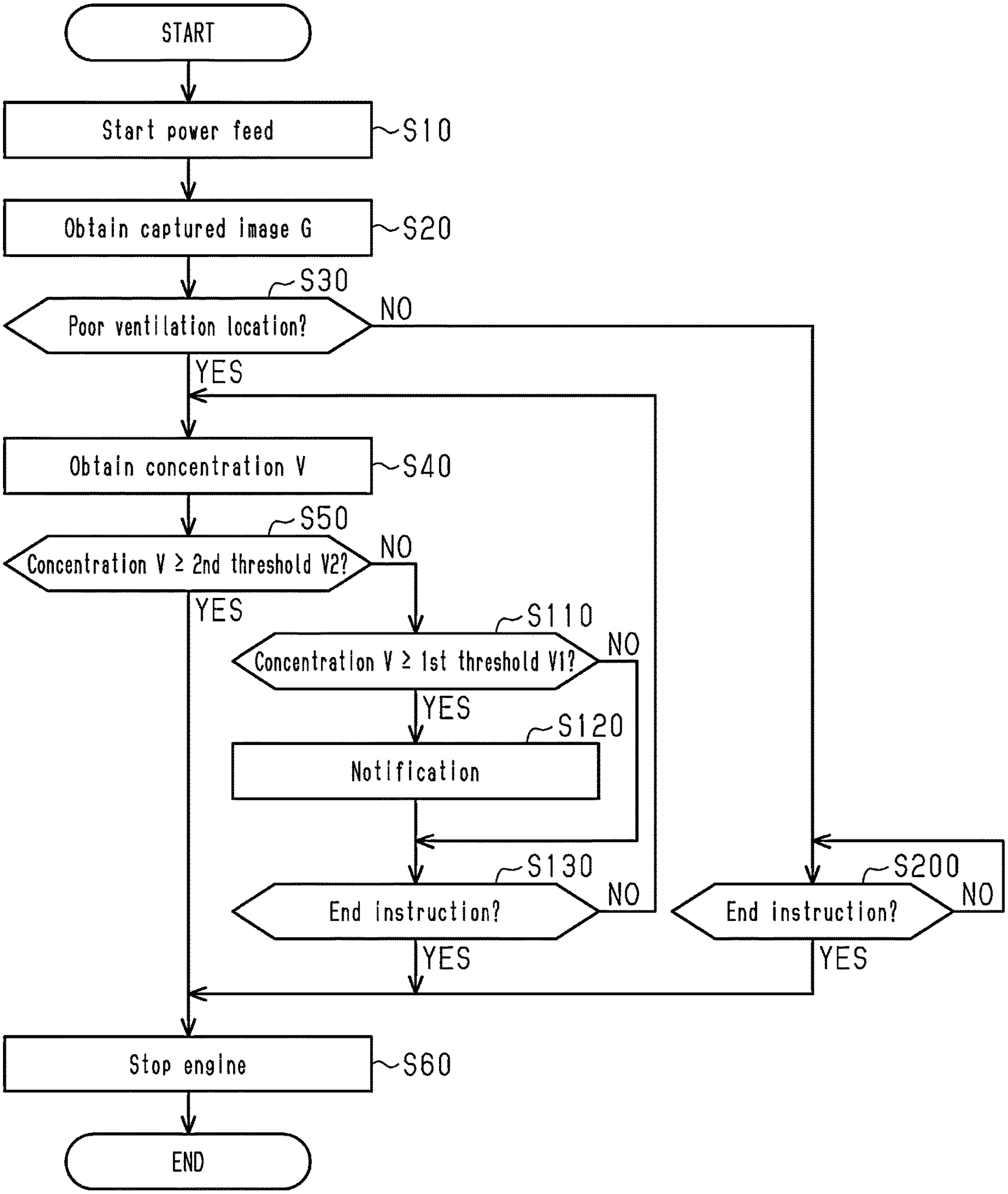
FIG. 2 is a flowchart illustrating a procedure of a power feed process.

When the start signal T1 is received in response to a user's operation, the information processor 20 starts the power feed process in response to the reception of the start signal T1. As shown in FIG. 2, when the power feed process is started, the information processor 20 first executes a process of step S10. In step S10, the information processor 20 causes the power feed device 10A to start external power feeding. Specifically, the information processor 20 brings the clutch 54 into the connected state. At the same time, the information processor 20 starts the engine 50. In addition, the information processor 20 starts a power generation operation in which the generator motor 52 is controlled such that the generator motor 52 generates electric power by the power of the engine 50. The information processor 20 realizes the power generation operation by controlling the PCU 66. Further, the information processor 20 brings the power feed relay 74 into the connected state. When the above processes are completed, external power feed is started. That is, the process of step S10 is a start process of causing the power feed device 10A to start external power feeding. Upon receiving the start signal T1, the information processor 20 performs such a start process. After causing the power feed device 10A to start external power feeding, the information processor 20 advances the processing to step S20.

In step S20, the information processor 20 causes each camera 90 to capture an image of each imaging range and to generate a captured image G. Then, the information processor 20 acquires the captured image G from each camera 90. The process of step S20 is an information obtaining process in which the information processor 20 obtains location information. Upon acquiring the captured image G, the information processor 20 advances the processing to step S30.

In step S30, the information processor 20 determines whether or not the place where the vehicle 10 is located satisfies a predetermined closed environment condition. The closed environment condition is a condition indicating a poorly ventilated place. The closed environment condition includes the following conditions (A1) and (A2). In the following description, a distance D1, D2, D3 between an outer surface of the vehicle 10 and a portion of an object 400 outside the vehicle, which faces the outer surface, is referred to as a facing distance D1, D2, D3. The facing distance D1, D2, D3 is measured in a direction substantially orthogonal to the outer surface of the vehicle 10. When attention is paid to one of the left, right, front, and rear directions of the vehicle 10, the maximum value of the facing distances D1, D2, D3 at various positions on the outer surface of the vehicle 10 is referred to as a maximum distance D1, D2, D3.

Figure 4:
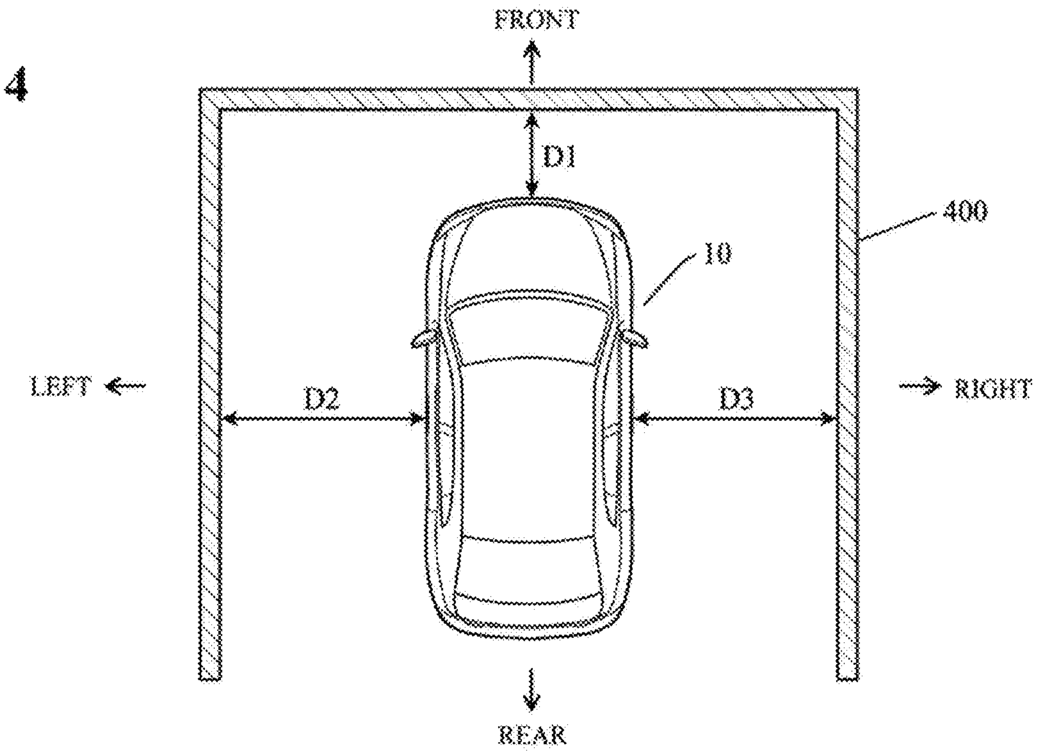
FIG. 4 illustrates an exemplary positional relationship between the vehicle and the continuous object surrounding the vehicle on three sides with respect to front, left, and right of the vehicle.

(A1) The vehicle 10 is surrounded by a single continuous object 400 from at least three directions of the front, rear, left, and right (see FIG. 4).

(A2) The maximum distances D1, D2, D3 between the outer surfaces of the vehicle 10 and the object 400 are equal to or less than the determination distances Dth in the respective directions in which the vehicle 10 and the object 400 face each other (see FIG. 4).

The continuous object 400 is, for example, a wall made of concrete, brick, wood, metal plate or the like. Note that even when the material or the like changes in the middle, if it is continuous without a gap, it is regarded as one connection.

Regarding the above (A2), the determination range is determined in advance as a predetermined value of 5 meters or less.

The information processor 20 determines whether or not the closed environment condition is satisfied by analyzing the captured image G acquired from each camera 90. When analyzing the captured image G, the information processor 20 uses, for example, a learned image recognition model that has been machine-learned in advance. Then, the information processor 20 grasps the shape, dimensions, position, and the like of the target object 400 by image recognition. As described above, in step S30, the information processor 20 determines whether or not the closed environment condition is satisfied based on the captured image G. In a case where at least one of the conditions (A1) and (A2) is not satisfied, that is, in a case where the place where the vehicle 10 is located does not satisfy the closed environment condition (step S30: NO), the information processor 20 advances the processing to step S200. In step S200, the information processor 20 waits until the end signal T2 is received. When information processor 20 receives end signal T2 (YES in step S200), the process proceeds to step S60. The contents of the processing in step S60 will be described later.

On the other hand, in step S30, in a case where both of the conditions (A1) and (A2) are satisfied, that is, in a case where the place in which the vehicle 10 is located satisfies the closed environment condition (step S30: YES), the information processor 20 performs the following start-up processing, and then advances the processing to step S40. In the activation process, the information processor 20 activates the exhaust gas sensor 92 and the crank position sensor 94 in the sleep state. Thereafter, each of the exhaust sensor 92 and the crank position sensor 94 repeats the detection of the parameter to be detected and the output of the signal corresponding to the detected information. The process of step S30 is a determination process of determining whether or not the location where the vehicle 10 is located satisfies the closed environment condition. The execution timing of the determination process is as follows. Upon receiving the start signal T1, the information processor 20 promptly performs step S10 and step S20, and advances the process to step S30. That is, the information processor 20 performs the determination process when the start signal T1 is received.

In step S40, the information processor 20 acquires the latest information on the concentration V of the specific components from the exhaust gas sensor 92. The process of step S40 is a concentration obtaining process. Thereafter, the information processor 20 advances the processing to step S50.

In step S50, the information processor 20 determines whether or not the concentration V of the specific components acquired in step S40 is equal to or higher than the second threshold V2. The second threshold V2 is determined in advance as a value larger than a first threshold V1 described later. The second threshold V2 is determined in advance as the concentration V at which the emission of the exhaust gas should be stopped from the viewpoint of safety although it does not affect the human body. In a case where the concentration V of the specific components is less than the second threshold V2 (step S50: NO), the information processor 20 advances the processing to step S110.

In step S110, the information processor 20 determines whether or not the concentration V of the specific components acquired in step S40 is equal to or higher than the first threshold V1. The first threshold V1 is determined in advance as a concentration V at which the concentration V of the specific components is still considerably low, but at which it is necessary to call the user's attention in order to continue the external power feed thereafter. In a case where the concentration V of the specific components is less than the first threshold V1 (Step S110: NO), the information processor 20 skips the process of Step S120 to be described later and advances the process to Step S130. On the other hand, when the concentration V of the specific components is equal to or higher than the first threshold V1 (step S110: YES), the information processor 20 advances the processing to step S120.

In step S120, the information processor 20 outputs the first notification information P1 and the first time information Q1 to the display 80. The first notification information P1 is command information for giving an instruction to display a message indicating that the vehicle 10 needs to be moved to another location in order to perform external power feed. That is, the first notification information P1 is information for notifying the user that the location movement of the vehicle 10 is necessary. The first time information Q1 is command information for instructing display of a prediction time during which external power feeding can be continued thereafter. That is, the first time information Q1 is information for notifying the user of the prediction time. A method of calculating the prediction time will be described later. The information processor 20 continues the process of step S120 for a predetermined set time. That is, the information processor 20 continues the output of the first notification information P1 and the first time information Q1 over the set time. The set time is, for example, 10 seconds. While the information processor 20 continues to output the first notification information P1 and the first time information Q1, the display 80 continues to display the video corresponding to these pieces of information. That is, the display 80 is a device that performs notification in accordance with the first notification information P1 and the first time information Q1.

In step S120, the information processor 20 outputs the second notification information P2 and the second time information Q2 to the speaker 82. The second notification information P2 is instruction information for instructing audio guidance indicating that the vehicle 10 needs to be moved to another location in order to perform external power feed. The second time information Q2 is instruction information for instructing voice guidance of the prediction time. Unlike the first notification information P1 and the first time information Q1, the information processor 20 does not continuously output the second notification information P2 and the second time information Q2 over the set time, but temporarily outputs them in the set time. When the information processor 20 outputs the second notification information P2 and the second time information Q2, the speaker 82 sequentially performs voice guidance corresponding to these pieces of information. That is, the speaker 82 is a device that performs notification in accordance with the second notification information P2 and the second time information Q2. When the set time elapses after the process proceeds to step S120, information processor 20 causes the process to proceed to step S130.

The process of step S120 described above, that is, the process of outputting the first notification information P1, the first time information Q1, the second notification information P2, and the second time information Q2 is an outputting process. The situation in which the process proceeds to step S120 is a situation in which the determination result of step S30 is affirmative (step S30: YES). That is, the information processor 20 performs the outputting process on condition that the determination result in the determination process of step S30 is positive.

In step S130, the information processor 20 determines whether the end signal T2 has been received from a recent start timing of the process of step S40 to the current point in time. In a case where the end signal T2 is received (step S130: YES), the information processor 20 advances the processing to step S60 described later. On the other hand, in a case where the end signal T2 is not received (step S130: NO), the information processor 20 returns to the process of step S40. In a case where step S130 is NO and a situation in which step S50 is NO continues, the information processor 20 repeats the processing from step S40 to step S130.

In step S50, when the concentration V of the specific component is equal to or higher than the second threshold V2 (step S50: YES), the information processor 20 advances the processing to step S60. In step S60, the information processor 20 causes the power feed device 10A to stop the external power feed. That is, the information processor 20 stops the operation of the engine 50. Further, the information processor 20 causes the generator motor 52 to stop the power generation operation. In addition, the information processor 20 brings the power feed relay 74 into a disconnected state. In addition, the information processor 20 sets the clutch 54 to the disconnected state. Further, the information processor 20 sets the exhaust gas sensor 92 and the crank position sensor 94 to the sleep state. After causing the power feed device 10A to stop the external power feed, the information processor 20 ends the series of processes of the power feed process. The process of step S60 for stopping the operation of the engine 50 is a stop process.

Prediction Time Calculation Method

In step S120, prior to outputting the first time information Q1 and the second time information Q2, the information processor 20 calculates a prediction time as part of the outputting process. As a premise for calculating the prediction time, the information processor 20 adjusts the rotation speed of the engine 50 so that the electric power required for the external power feed can be supplied to the electric load 104 during the execution of the external power feed. The rotation speed of the engine 50 is the rotation speed of the crankshaft 50A. The power required for the external power feeding is, for example, designated by the user through the display 80 or automatically recognized by the information processor 20 itself. Note that the information processor 20 repeatedly calculates the rotation speed of the engine 50 based on the transition of the rotational position Y of the crankshaft 50A acquired from the crank position sensor 94 after the determination in step S30 becomes YES and the crank position sensor 94 is activated. Further, the information processor 20 stores an exhaust map in advance. The exhaust map represents a relationship between the rotation speed of the engine 50 and the discharge speed of a specific component contained in the exhaust gas. The discharge rate of the specific component is a discharge amount of the specific component per unit time.

When calculating the prediction time, the information processor 20 refers to the current rotation speed, which is the rotation speed of the engine 50 at the start of the process of step S120, and the exhaust map. Then, the information processor 20 calculates the discharge speed of the specific component corresponding to the current rotation speed as the current discharge speed based on the exhaust map. After calculating the current discharge speed, the information processor 20 calculates the allowable amount. The allowable amount is a value obtained by subtracting the concentration V of the specific components acquired in the most recent step S40 from the second threshold V2. Thereafter, the information processor 20 calculates the prediction time based on the allowable amount and the current discharge speed. Specifically, the information processor 20 calculates the prediction time by dividing the allowable amount by the current discharge speed. The information processor 20 calculates the prediction time in this way. As can be seen from the calculation method of the prediction time, the prediction time is a prediction time until the concentration V of the specific component reaches the second threshold V2 thereafter. Then, the information processor 20 calculates the prediction time based on the rotation speed of the engine 50 at the time of performing the process of step S120. It should be noted that the rotation speed of the engine 50 to be referred to when the information processor 20 performs step S120 for the first time after the start of the power feed process is the rotation speed of the engine 50 at the time when the concentration V of the specific components reaches the first threshold V1. That is, the information processor 20 calculates the prediction time based on the rotation speed of the engine 50 at the time when the concentration V of the specific components reaches the first threshold V1 in the process of the step S120 for the first time.

In step S120, the information processor 20 calculates the prediction time as described above, and then outputs the calculated prediction time as the first time information Q1 and the second time information Q2.

Operation of the Embodiment

The flow of the power feed process will now be described on the premise that there is no end instruction from the user. Upon reception of the start signal T1, the information processor 20 causes the power feed device 10A to start the external power feed (step S10). During execution of the external power feed, if the closed environment condition is satisfied (step S30: YES), the information processor 20 repeats the process that obtains the concentration V of the specific component in the ambient atmosphere of the vehicle 10 (step S40). When the concentration V of the specific component reaches the first threshold V1 (step S110: YES), the information processor 20 outputs the first notification information P1 and the first time information Q1 to the display 80 (S120). In addition, the information processor 20 outputs the second notification information P2 and the second time information Q2 to the speaker 82. Thereafter, the information processor 20 repeatedly outputs the first notification information P1, the first time information Q1, the second notification information P2, and the second time information Q2. During such repetitions, the prediction time output through the first time information Q1 and the second time information Q2 gradually decreases. When the concentration V of the specific component reaches the second threshold V2 (step S50: YES), the information processor 20 stops the operation of the engine 50 and, in turn, stops the external power feed (step S60).

Advantages of Embodiment (1) In the present embodiment, when the external power feed is performed in a location where ventilation is poor, the user is prompted to change the location of the vehicle 10. This increases the likelihood of the user moving the vehicle 10 to a location where ventilation is sufficient and performing the external power feed.

(2) If the concentration V of the specific component in the ambient atmosphere of the vehicle 10 is extremely low, performing the external power feed in a poorly ventilated location will not be a problem. In such a situation, the information processor 20 does not perform any process. This configuration avoids unnecessarily restricting the external power feed. On the other hand, when the concentration V of the specific component becomes slightly high, the information processor 20 issues a notification indicating that the location of the vehicle 10 needs to be changed. Since the user is prompted to move the location of the vehicle 10 at this stage, the likelihood of the user moving the vehicle 10 before the concentration V of the specific component starts to rise in the ambient atmosphere becomes higher. This avoids the specific component filling the surroundings of the vehicle 10. Furthermore, when the concentration V of the specific component becomes moderately high, the information processor 20 stops the external power feed. In this manner, the information processor 20 ensures that the specific component will not fill the surroundings of the vehicle 10.

(3) When the information processor 20 notifies the user that the location of the vehicle 10 needs to be changed, the information processor 20 also notifies the user of the prediction time for which the external power feed can be continued. This notification of the prediction time allows the user to acknowledge the time for which the external power feed can be continued thereafter. This assists the user in setting the next action plan.

(4) When the vehicle 10 is surrounded on three sides, an airflow around the vehicle 10 is likely to be poor. If the engine 50 is continuously operated in such a location, exhaust may fill the surroundings of the vehicle 10. Therefore, in order to avoid the exhaust filling the surroundings of the vehicle 10, it is effective to issue a notification prompting the user to move the vehicle 10 or the like in such a location.

MODIFIED EXAMPLES

The above-described embodiments may be modified as follows. The above embodiment and the following modifications may be combined as long as the combined modifications remain technically consistent with each other.

The device that outputs the start signal T1 is not limited to the changeover switch 33. For example, the display 80 may output the start signal T1 or the user terminals 200 may output the start signal T1 in response to a user's operation. Similarly to the start signal T1, the device that outputs the end signal T2 is not limited to the changeover switch 33.

A target to which the information processor 20 outputs the first notification information P1 and the first time information Q1 is not limited to the display 80. The information processor 20 may output the first notification information P1 and the first time information Q1 to the user terminals 200 instead of or in addition to the display 80. Similarly to the first notification information P1 and the first time information Q1, a target to which the information processor 20 outputs the second notification information P2 and the second time information Q2 is not limited to the speaker 82.

It is not essential to output the first time information Q1. The same applies to the second time information Q2.

It is not essential that the information processor 20 starts the start processing in response to the reception of the start signal T1. The information processor 20 may be configured to perform the determination process in response to reception of the start signal T1 regardless of whether or not external power feeding is started. Then, the information processor 20 may be configured to output notification information for notifying the user that the vehicle 10 needs to move to another place on condition that the determination result of the determination process is positive. The timing of outputting the notification information may not be related to the concentration V of the specific component.

The closed environment condition is not limited to the example of the above embodiment. The closed environment condition may indicate that the place where the vehicle 10 is located is a poorly ventilated place.

Figure 3:
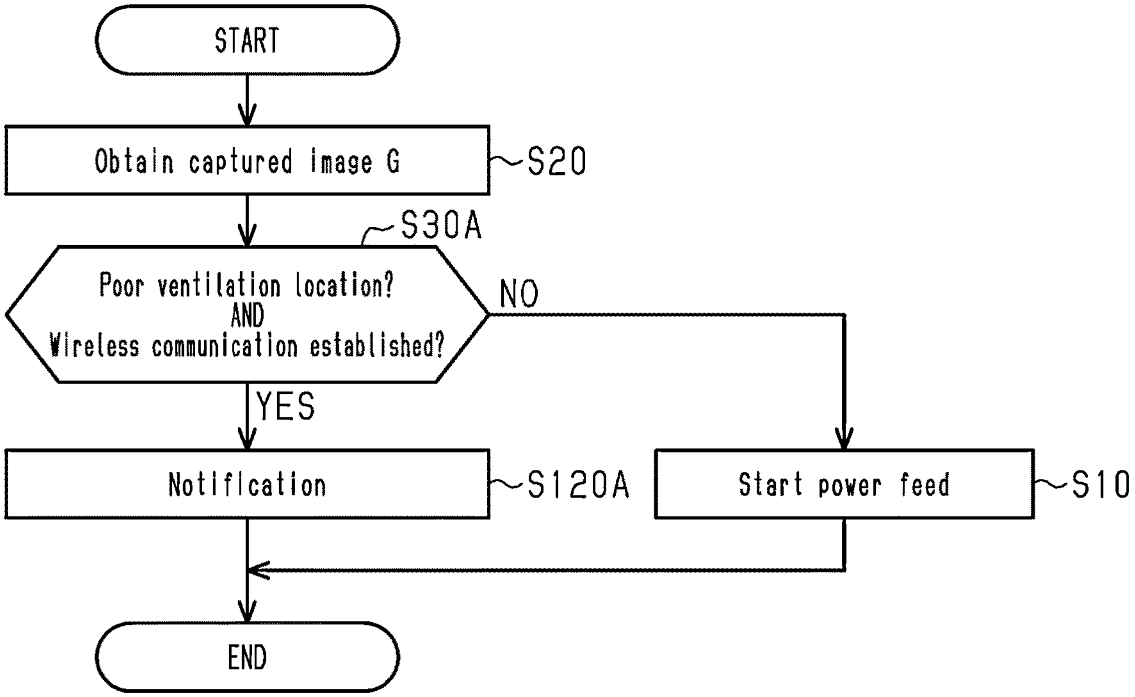
FIG. 3 is a flowchart illustrating a procedure of a selection process.
Figure 5:
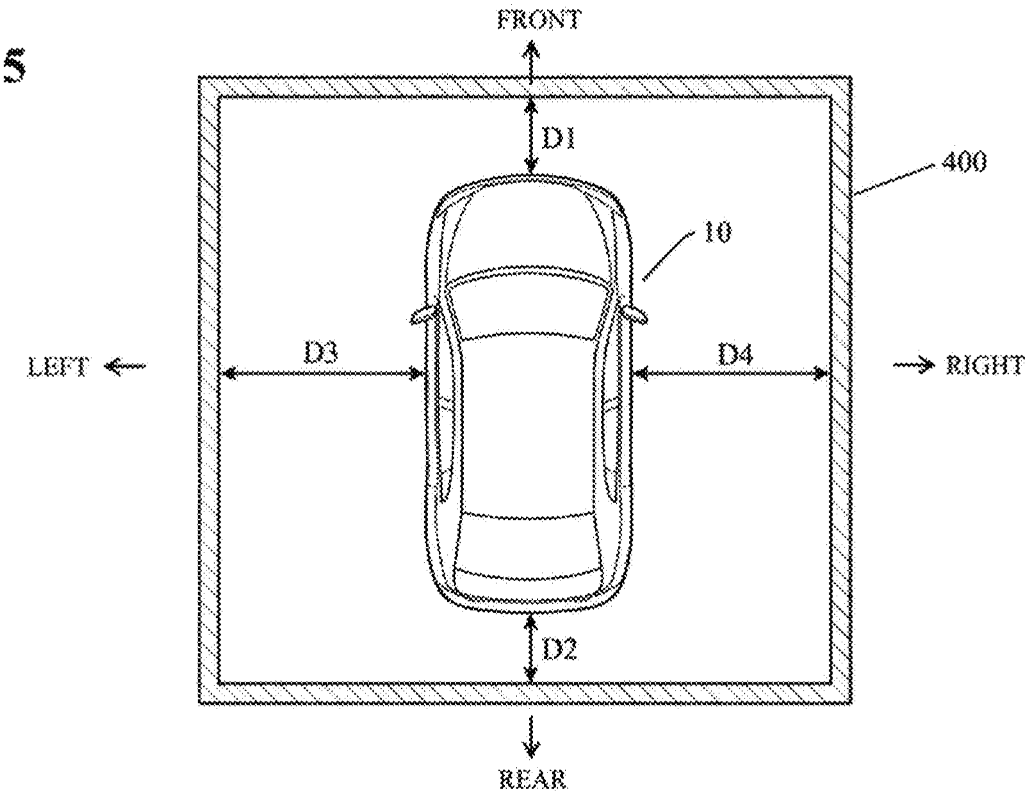
FIG. 5 illustrates an exemplary positional relationship between the vehicle and the continuous object surrounding the vehicle on four sides with respect to front, rear, left, and right of the vehicle.

Among the conditions (A1) and (A2) constituting the closed environment condition, the condition (A1) may be changed to the following condition (N). The condition (N) is that the vehicle 10 is surrounded by a single continuous object 400 from four directions, i.e., front, rear, left, and right (see FIG. 5). (N) and the condition (A2) of the above-described embodiment, the information processor 20 may perform a selection process of selecting whether or not to start external power feeding in response to the reception of the start signal T1. As shown in FIG. 3, in the selection process, first, the information processor 20 performs an information acquiring process similar to step S20 of the above embodiment. In FIG. 3, steps in which the same processes as those in FIG. 2 are performed are denoted by the same step numbers as those in FIG. 2. After executing the process of step S20, in step S30A, the information processor 20 performs, as a determination process, a first determination of determining whether or not the place where the vehicle 10 is located satisfies the closed environment condition and, in addition, a second determination of determining whether or not near field communication between the user terminals 200 and the vehicle 10 is established. The first determination is performed by the information processor 20 analyzing the captured image G using an image recognition model or the like, as in step S30 of the above embodiment. In a case where the determination results of both the first determination and the second determination are positive (step S30A: YES), the information processor 20 performs the process of step S120A with the obtainment of the determination results as a trigger. That is, in step S120A, the information processor 20 outputs the first notification information P1 and the second notification information P2 in the same manner as in step S120 of the above-described embodiment. At the same time, the information processor 20 maintains the engine 50 in a stopped state in step S120A. Then, the information processor 20 ends the selection process. An object to which the first notification information P1 is outputted is, for example, the display 80. A target to which the second notification information P2 is outputted is, for example, the speaker 82. As in the above-described embodiment, for example, the information processor 20 continues the process of step S120A and thus the output of the first notification information P1 for a set time, and temporarily outputs the second notification information P2 during the set time. When at least one of the first determination and the second determination is negative in step S30A (step S30A: NO), information processor 20 causes power feed device S10 to start external power feeding in step 10A. Thereafter, the information processor 20 ends the selection process. Thereafter, the information processor 20 may notify the user or stop the engine 50 in accordance with the concentration V of the specific component, for example.

When the vehicle 10 is surrounded from four directions, it is difficult for wind to pass around the vehicle 10. When the engine 50 is driven in such a place, the surroundings of the vehicle 10 can be immediately filled with exhaust gas. It is not preferable that the user is placed in such an environment. Here, when the short-range wireless communication is established, there is a high possibility that the user is in the immediate vicinity of the vehicle 10. Therefore, in the selection process, when the determination results of both the first determination and the second determination are affirmative, the information processor 20 prohibits the operation of the engine 50 and thus the external power feed at that time. Thus, it is possible to prevent the user from being placed in an environment in which the user is likely to be immediately filled with the exhaust gas.

The location information is not limited to the example of the above embodiment. The location information may be appropriate from the viewpoint of determining whether or not the vehicle 10 is located in a poorly ventilated place.

The device that acquires the information regarding the place where the vehicle 10 is located is not limited to the camera 90. For example, instead of or in addition to the camera 90, a sonar that detects a distance between the vehicle 10 and an object 400 around the vehicle 10 by using ultrasonic waves may be adopted as the device. The configuration of the device is not limited as long as the device can acquire the information on the place where the vehicle 10 is located.

The communication standard used in short-range wireless communication is not limited to BLE.

The vehicle 10 may include a plurality of exhaust gas sensors 92. The plurality of exhaust sensors 92 may detect different concentrations V of the specific component. When a plurality of exhaust gas sensors 92 are provided in the vehicle 10, the first and second thresholds V1 and V2 in the power feed process may be determined in advance for each of the specific components. When the vehicle 10 is provided with a plurality of exhaust gas sensors 92, an exhaust gas map may be prepared in advance for each specific component. In the power feed process, the following modes may be employed. That is, in step S40, the information processor 20 acquires one or more of the concentrations V of the plurality of specific components. Then, in step S50 and step S110, the information processor 20 handles the determination result of each process as YES when the concentration V of any of the plurality of specific components reaches the thresholds. When calculating the prediction time in step S120, the information processor 20 calculates the prediction time for each of the specific components to be detected. Then, in step S120, the information processor 20 notifies the user of the shortest prediction time among the prediction times of the specific components as the first time information Q1 and the second time information Q2. Note that the vehicle 10 is not necessarily provided with the exhaust gas sensor 92. That is, the exhaust gas sensor 92 may be omitted from the vehicle 10.

The overall configuration of the vehicle 10 is not limited to the example of the above embodiment. For example, the vehicle 10 may include a generator motor for traveling in addition to the generator motor 52.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An information processor for a vehicle, the vehicle including a power feed device configured to perform external power feed that supplies power generated by a generator using driving force of an engine to a load outside the vehicle, the information processor comprising:

processing circuitry, wherein the processing circuitry is configured to execute:

a start process that causes the power feed device to start the external power feed by starting the engine and starting a power generation operation in which the generator is controlled such that the generator generates electric power by power of the engine, in response to receiving a command signal for instructing start of execution of the external power feed, an information acquisition process that acquires location information related to a location of the vehicle, wherein the acquired location information includes captured images generated by cameras included in the vehicle, the captured images indicating a positional relationship between the vehicle and an object located outside the vehicle;

a determination process that determines, based on analyzing the captured images through using a learned image recognition model that has been machine-learned in advance, whether the location of the vehicle satisfies a predetermined condition indicating a location where ventilation is poor, the determination process being initiated by reception of the command signal for instructing the start of the execution of the external power feed, wherein the processing circuitry is configured to execute the determination process that determines, based on analyzing the captured images through using the learned image recognition model that has been machine-learned in advance, whether the location of the vehicle satisfies the predetermined condition indicating the location where ventilation is poor by:

analyzing the captured images indicating the positional relationship between the vehicle and the object located outside the vehicle through using the learned image recognition model that has been machine-learned in advance, thereby grasping a shape, dimensions, and a position of the object located outside the vehicle by image recognition, and determining, based on the grasped shape, the grasped dimensions, and the grasped position of the object located outside the vehicle, whether (i) the vehicle is surrounded on at least three sides with respect to front, rear, left, and right of the vehicle by the object that is continuous, and (ii) a distance between the vehicle and the object is less than or equal to a predetermined determination distance at each of the three sides;

an output process that outputs notification information for notifying a user that the location of the vehicle needs to be changed, the output process being performed in response to the determination process determining that the location of the vehicle satisfies the predetermined condition; and based on determining, based on the grasped shape, the grasped dimensions, and the grasped position of the object located outside the vehicle, (i) the vehicle is surrounded on the at least three sides with respect to the front, the rear, the left, and the right of the vehicle by the object that is continuous, and (ii) the distance between the vehicle and the object is less than or equal to the predetermined determination distance at each of the three sides, causing the power feed device to stop the external power feed by stopping the engine even when the processing circuitry has not received a command signal for instructing ending of the external power feed.

2. The information processor according to claim 1, wherein:

components contained in exhaust from the engine other than oxygen and nitrogen correspond to specific components;

the processing circuitry is configured to repeat a concentration acquisition process that acquires a concentration of at least one of the specific components in an ambient atmosphere of the vehicle during execution of the external power feed;

the processing circuitry is configured to execute the output process in response to the determination process determining that the location of the vehicle satisfies the predetermined condition and the concentration reaching a predetermined first threshold;

the processing circuitry is configured to execute a stop process that stops operation of the engine in response to the determination process determining that the location of the vehicle satisfies the predetermined condition and the concentration reaching a second threshold; and the second threshold is set to be greater than the first threshold in advance.

3. The information processor according to claim 2, wherein:

in the output process, the processing circuitry is configured to calculate a prediction time until the concentration reaches the second threshold based on a rotational speed of the engine at a time point at which the concentration reached the first threshold; and the processing circuitry is configured to output, together with the notification information, time information for notifying the user of the calculated prediction time.

4. The information processor according to claim 1, wherein:

the location information relates to a positional relationship between the vehicle and a object located outside the vehicle;

the predetermined condition indicating a location where ventilation is poor is that the vehicle is surrounded on four sides with respect to front, rear, left, and right of the vehicle by the object that is continuous, and a distance between the vehicle and the object is less than or equal to a predetermined determination distance at each of the four sides;

the determination process includes a first determination that determines whether the location of the vehicle satisfies the predetermined condition indicating a location where ventilation is poor, and a second determination that determines whether wireless communication is established between an operation terminal carried by a user and the vehicle; and the processing circuitry is configured to execute the output process and maintain the engine in a stopped state in response to the location of the vehicle satisfying the predetermined condition and the wireless communication being established.

5. The information processor according to claim 1, wherein, in the determination process, for each of the at least three sides with respect to the front, the rear, the left, and the right of the vehicle, the processing circuitry is configured to:

determine, based on the grasped shape, the grasped dimensions, and the grasped position of the object, facing distances between an outer surface of the vehicle and portions of the object that face the outer surface, the facing distances being measured in a direction substantially orthogonal to the outer surface of the vehicle;

determine a maximum value of the facing distances at the side; and determine that the distance between the vehicle and the object is less than or equal to the predetermined determination distance at the side when the maximum value is less than or equal to the predetermined determination distance, and wherein the predetermined determination distance is a value of 5 meters or less.

6. The information processor according to claim 1, wherein:

the power feed device includes a connection device to which the load outside the vehicle is connectable, a power feed relay configured to switch an electrical connection between the load outside the vehicle and the generator, and a clutch configured to selectively connect the engine and the generator; and the processing circuitry is configured to cause the power feed device to stop the external power feed by stopping the engine, stopping the power generation operation of the generator, bringing the power feed relay into a disconnected state, and bringing the clutch into a disconnected state.

7. The information processor according to claim 1, wherein:

the output process that outputs the notification information for notifying the user that the location of the vehicle needs to be changed includes outputting the notification information for notifying the user that the location of the vehicle needs to be changed on a display located inside the vehicle.

* * * * *